United States Patent [19]

Stewart

[11] 4,041,546
[45] Aug. 9, 1977

[54] SOLENOID DRIVER CIRCUIT

[75] Inventor: John W. Stewart, Wichita, Kans.

[73] Assignee: NCR Corporation, Dayton, Ohio

[21] Appl. No.: 693,034

[22] Filed: June 4, 1976

[51] Int. Cl.$^2$ .......................................... H01H 47/04
[52] U.S. Cl. .................................................. 361/152
[58] Field of Search ........... 317/123, 148.5 R, DIG. 4

[56] References Cited

U.S. PATENT DOCUMENTS

| | | | |
|---|---|---|---|
| 3,237,088 | 2/1966 | Karp et al. | 317/DIG. 4 |
| 3,549,955 | 12/1970 | Paine/Crawford | 317/DIG. 4 |
| 3,579,052 | 5/1971 | Kato | 317/DIG. 4 |
| 3,786,314 | 1/1974 | Misch | 317/DIG. 4 |
| 3,896,346 | 7/1975 | Ule | 317/DIG. 4 |

Primary Examiner—Harry E. Moose, Jr.
Attorney, Agent, or Firm—J. T. Cavender; Albert L. Sessler, Jr.

[57] ABSTRACT

A circuit for applying a driving voltage to an inductive load for a period of time sufficient to increase the current in the load to a maximum desired level, and for disconnecting the driving voltage for fixed intervals between each application so as to maintain the level of current flow through the inductive load below the maximum desired level so as to permit the application of a high drive voltage without causing excessive heating in the inductor.

10 Claims, 12 Drawing Figures

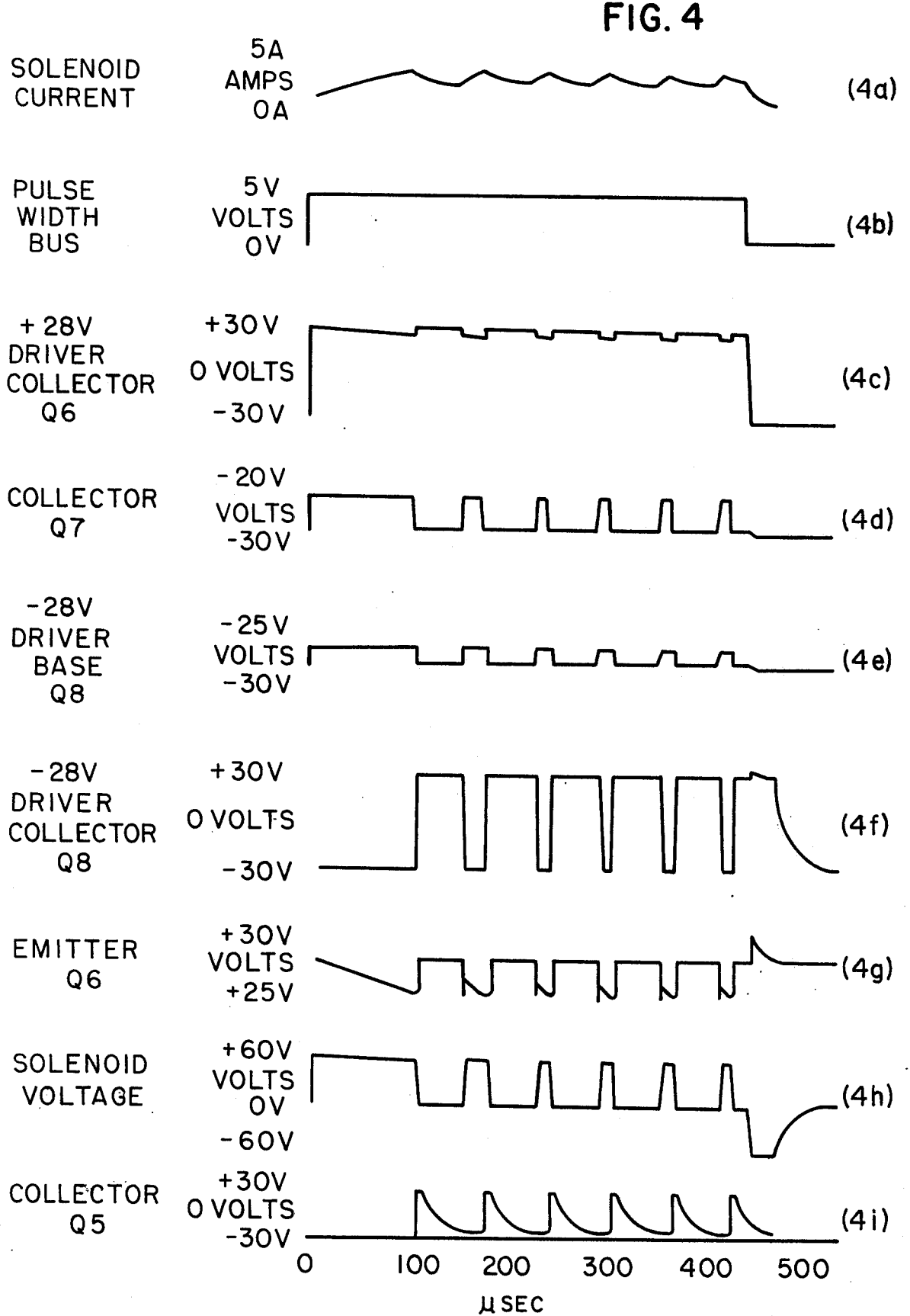

SOLENOID DRIVER CIRCUIT

BACKGROUND OF THE INVENTION

In the field of high-speed printing devices of the type which are especially suitable for use in connection with electronic business systems, the wire matrix type of printer has come into increasing use. In this type of printer, letters, numbers and symbols are formed from a series of dots produced by the impact of the ends of a plurality of wire elements on record media.

A wire matrix printer of the type that may be used with the present invention is disclosed in U.S. Pat. No. 3,882,985 entitled "Tiltable Matrix Print Head to Permit Viewing of Characters", by George N. Liles. Each of the individual wire printing elements of the wire matrix printer is driven by a solenoid that is energized when a printing stroke of that particular wire is required. A solenoid is generally defined as an electrically energized inductor which may consist of one or more layers of windings so as to form an electromagnet. A circuit for driving the solenoids must therefore be capable of quickly driving the solenoid with an adequate and repeatable magnitude of force and in addition the solenoid driving circuit must enable a rapid recovery of the solenoid from the printing stroke in preparation for the next stroke. This must all be done while simultaneously protecting the solenoid winding against damage from overheating. In such applications we are therefore faced with conflicting requirements, namely a high voltage must be applied to the solenoid in order to decrease its activation time, but this high voltage, in turn, will cause a high level of current to flow through the solenoid winding causing heating in excess of design limits.

In U.S. patent application Ser. No. 627,736 entitled "Drive Circuit", by John W. Stewart et al., which application is assigned to NCR Corporation, the assignee of the present invention, there is disclosed a circuit for coupling a supply voltage to a solenoid so as to inhibit the circuit if the supply voltage exceeds predetermined variations.

Another prior art circuit of interest is disclosed in U.S. Pat. No. 3,549,955 entitled "Drive Circuit For Minimizing Power Consumption In Inductive Load" by T. O. Paine. The circuit disclosed in the patent utilizes two differing threshold voltage levels, one of which initially allows the driving voltage applied to the solenoid to be applied for a period which is sufficient to permit the current through the solenoid to exceed the "pull-in" current. The circuit then automatically terminates the driving voltage and the current through the solenoid is permitted to decay to a value just exceeding the "drop-out" current. The circuit then continues to cycle on and off to alternately drive current through the solenoid and to permit it to decay.

SUMMARY OF THE INVENTION

The purpose of the present invention is to provide a drive circuit for solenoid energization which circuit minimizes the activation time of the solenoid by periodically applying a driving voltage to the solenoid for periods of time which are sufficient to increase the current in the solenoid to a maximum desired level. A current level detector detects the current level through the solenoid and disconnects the driving voltage when the current through the solenoid exceeds the maximum desired level. A timing means fixes the interval between the application of the driving voltages so as to maintain the level of current flow through the solenoid below a desired level. Regulation of the solenoid current is effected by repeating the on-off cycles of the driver. For a given power supply voltage, the present circuit provides the fastest possible turn-on and turn-off time of the solenoid while maintaining low power dissipation and conserving solenoid energy.

From the foregoing it can be seen that it is an object of the present invention to provide an improved solenoid driver circuit.

It is a further object of the present invention to provide a solenoid driver circuit utilizing current regulation while maintaining low activation times.

These and other objects of the present invention will become more apparent when taken in conjunction with the following description and drawings which drawings form a part of the specification and wherein like characters indicate like parts.

BRIEF DESCRIPTION OF THE DRAWINGS

FIGS. 4A to 4I are waveforms taken at points in the driver circuit of FIG. 1.

DESCRIPTION OF THE PREFERRED EMBODIMENT

Figure 1:
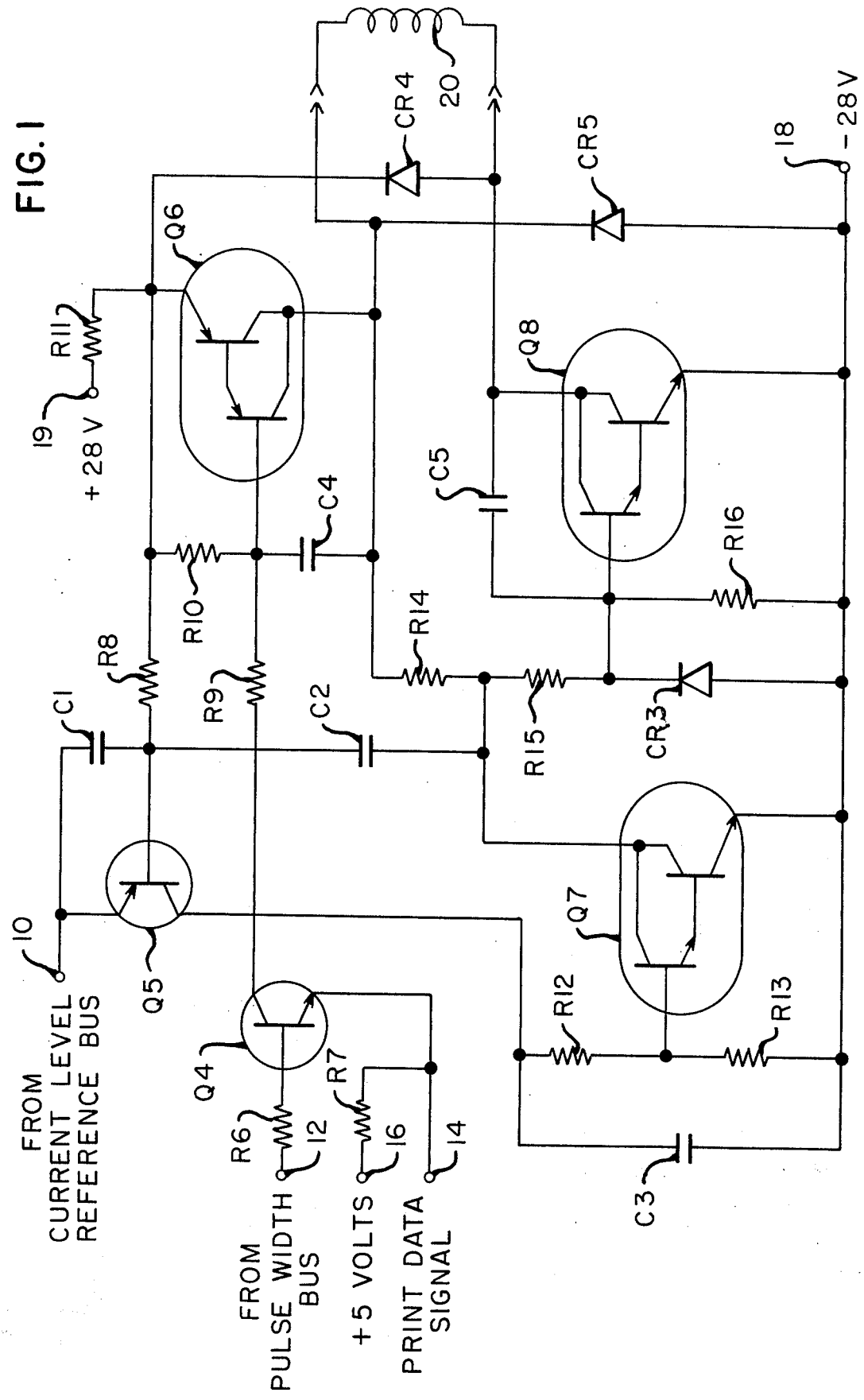
FIG. 1 is a schematic diagram of a coil driver circuit.

In FIG. 1 there is shown an individual solenoid driver circuit. In a wire matrix print head there are a plurality of solenoids, one for each of the print wires; therefore a corresponding number of solenoid driver circuits are used, one for each solenoid. Starting from the input side of the circuit, the NPN transistor Q4 has its base coupled to the terminal 12 by means of a resistor R6. Terminal 12 receives a PULSE WIDTH BUS signal from the pulse width driver circuit (described in FIG. 2). The emitter of transistor Q4 is connected to a PRINT DATA signal terminal 14 and to a positive 5 volt source applied to terminal 16, via a resistor R7. The collector of transistor Q4 is connected to the base of a Darlington pair Q6, hereinafter referred to as transistor Q6, by means of a resistor R9. The PNP transistor Q5 has its emitter connected directly to terminal 10 and to its base by means of a capacitor C1. The collector of transistor Q5 is connected to the base of an NPN Darlington pair Q7, hereinafter referred to as transistor Q7, by means of a resistor R12 and to a −28 volt terminal 18 by means of a capacitor C3. The base of transistor Q5 is coupled to a positive 28 volt source applied to terminal 19 by means of resistors R8 and R11. The base of transistor Q5 is also coupled to the base of the NPN Darlington pair Q8, hereinafter referred to as transistor Q8, by means of the series connection of capacitors C2 and R15. The base of the transistor Q7 is connected to the terminal 18 by means of resistor R13 with the emitter of transistor Q7 connected directly to terminal 18. The collector of transistor Q7 is connected to the juncture point of capacitor C2 and resistor R15. The juncture point of resistors R8 and R11 is connected to the base of transistor Q6 by means of resistor R10. The base of transistor Q6 is connected to the juncture point of resistor R15 and capacitor C2 by means of the series connection of capacitor C4 and resistor R14. The collector of transistor Q6 is connected to one end of the solenoid 20. The collector of transistor Q6 is also connected to the terminal 18 by a diode CR5. The emitter of transistor Q6 is connected to the opposite end of solenoid 20 by a diode CR4. The collector of transistor Q8 is connected to the opposite end of solenoid 20, and by means of a capacitor C5 to its base. The base of transistor Q8 is connected to terminal 18 by means of resistor R16. The emitter of transistor Q8 is connected directly to terminal 18.

In operation a print cycle will begin when a positive 5 volt level PULSE WIDTH BUS signal is applied to terminal 12 and the PRINT DATA SIGNAL applied to terminal 14 goes low. In this condition transistor Q4 will be turned on and driven into saturation. The voltage differential across R9 will supply base current to turn on transistor Q6. Transistor Q6 operates as the positive 28 volt driver. As transistor Q6 saturates, it raises one end of the solenoid winding to +28 volts, and it also raises the potential across R14 and R15. This potential supplies base current for transistor Q8, the negative 28 volt driver. As transistor Q8 saturates, it forces the other end of the solenoid winding to −28 volts. The net voltage applied across the solenoid winding is thus 56 volts. Both transistors Q6 and Q8 remain saturated until the solenoid current reaches the desired level. This level is set by the voltage difference between the plus 28 volt supply and the level of the voltage on terminal 10 supplied by the current level reference bus. The current flowing through the solenoid creates a voltage drop in R11. This drop is fed to the base of Q5 through R8. As the selected current level is reached, Q5 becomes forward biased and turns on. The collector current of Q5 acts to charge C3, which sets the off-time period of the solenoid driver circuit. In the preferred embodiment this period was set to be between 32 and 60 microseconds. As C3 charges, base current is supplied by R12 to transistor Q7. This turns on transistor Q7 and causes its collector potential to become more negative. This in turn creates a current flow in C2 which increases the base current of Q5. This effectively is a re-generation feedback path which assures that Q5 and transistor Q7 will drive each other into saturation after turn-on is initiated. The desired effect is to turn the driver off at the desired current level. This is accomplished as transistor Q7 saturates and captures the base current source of transistor Q8, turning −28 volt driver off. As transistor Q8 turns off the collector potential becomes more positive because the solenoid is acting to maintain its established current flow. Diode CR4 limits the maximum positive excursion of the collector. With CR4 in conduction the net solenoid coil voltage is limited to approximately −2 volts because of the voltage across transistor Q6 and CR4. This clamped voltage prevents the rapid decay of solenoid current and magnetic flux in the print head. This clamp voltage is maintained for approximately 45 microseconds. The time is determined by the discharge time of capacitor C3. Capacitor C3 begins to discharge when Q5 turns off. This occurs when transistor Q8 turns off and transfers the solenoid current to CR4. The transfer eliminates current flow in R11 and thus turns off Q5. When C3 discharges sufficiently it turns transistor Q7 off; this in turn allows a current path through R14 and R15 which effectively turns on transistor Q8. As transistor Q8 turns on it must carry the solenoid current plus the recovery current for CR4. The recovery current is a charge stored in the diode which must be removed before the diode can come out of saturation. Since the current in R11 is also the sum of these two currents it is possible that the peak current in R11 may exceed the normal regulated current value during the recovery period of the diode. In order to prevent this peak current from turning the driver back off, R8 and C1 provide the necessary delay time in the current sense circuit to allow CR4 to recover. With CR4 out of saturation, transistor Q8 saturates and again supplies 56 volts to the solenoid 20. The solenoid current increases and the driver again turns off. This cycle is repeated as many times as necessary until the pulse width signal applied to terminal 12 elapses. At this time the PULSE WIDTH BUS signal drops to logic ground potential and Q4 turns off; this removes the base drive for transistor Q6 and it turns off. As transistor Q6 turns off collector potential is driven negative by the solenoid 20. The negative limit is provided by CR5 which limits the collector potential to the negative supply potential −28 volts. As the collector of transistor Q6 moved negative it removed the potential across R14 and R15, thus eliminating the base current for transistor Q8 which in turn, turns off. The solenoid again causes the collector potential of transistor Q8 to increase with the voltage being limited by CR4. This current is now being returned to the power supply by the solenoid through CR4 and CR5. The voltage across the coil at this point is approximately 60 volts and of a polarity which is opposite to the initially applied voltage source.

Figure 2:
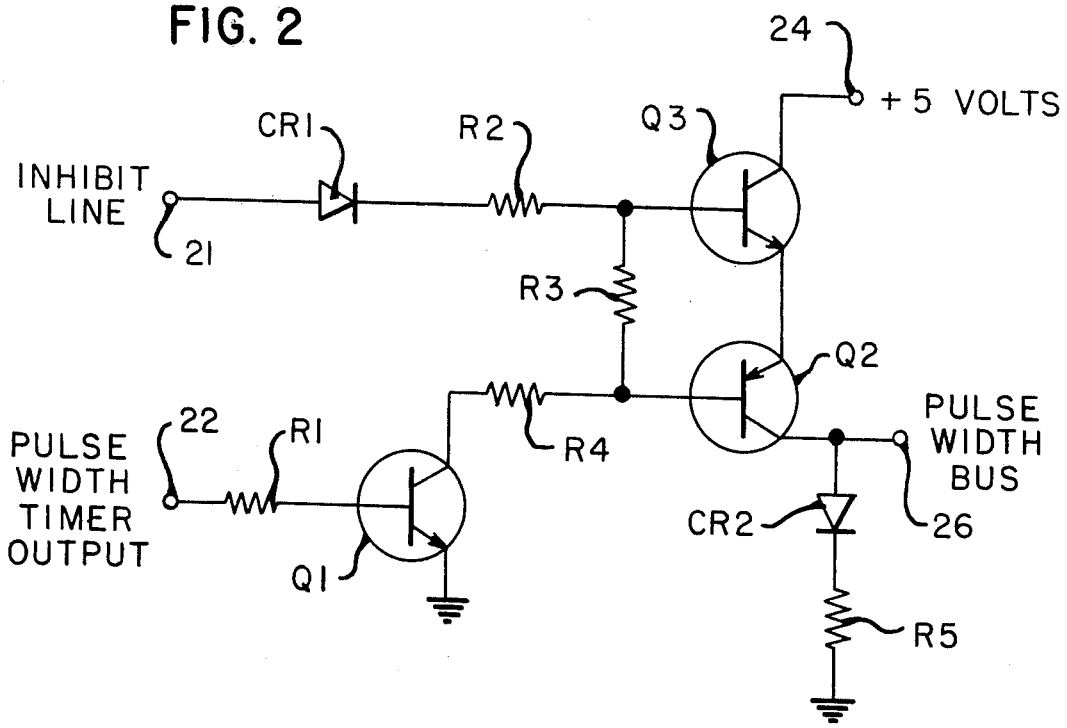
FIG. 2 is a schematic diagram of a pulse width bus driver which may be used in conjunction with the coil driver circuit of FIG. 1.

Referring to FIG. 2, a circuit which may be used to provide the PULSE WIDTH BUS signal is shown. Terminal 21 which receives an INHIBIT signal is connected to the base of an NPN transistor Q3 by means of a series connection comprised of diode CR1 and resistor R2. The collector of transistor Q3 is connected to terminal 24 which in turn receives a positive 5 volts from a potential source not shown. An NPN transistor Q1 has its base connected to terminal 22 by resistor R1 and its emitter connected directly to ground. Terminal 22 receives a PULSE WIDTH TIMER OUTPUT signal from a source not shown. The signal on terminal 22 is made positive for a period of time corresponding to a desired print cycle, generally by a timing circuit. For each application the print cycle may vary in length and be controlled by differing circuits, all of which is well within the skill of the art and is not shown for purposes of clarity. The collector of Q1 is connected to the base of a PNP transistor Q2 by means of a resistor R4. The bases of transistor Q3 and Q2 are connected by a resistor R3. The collector of transistor Q2 is connected to ground by a series connection comprised of diode CR2 and resistor R5. The output of the driver circuit is connected to terminal 26 and to the collector of transistor Q2. In operation, when a positive INHIBIT signal is received on input terminal 21 along with a positive PULSE WIDTH TIMER OUTPUT signal being received on terminal 22, transistors Q1 and Q3 along with transistor Q2 are turned on and saturate. The positive voltage applied to the collector of Q3 is then felt at the output terminal 26; this positive level signal, the PULSE WIDTH BUS signal, is in turn applied to terminal 12 of the solenoid driver shown in FIG. 1. When a positive signal level is not available on either terminal 21 or 22 transistors Q3 and Q2 remain in the off condition and the voltage level of terminal 26 is substantially 0 volts.

Figure 3:
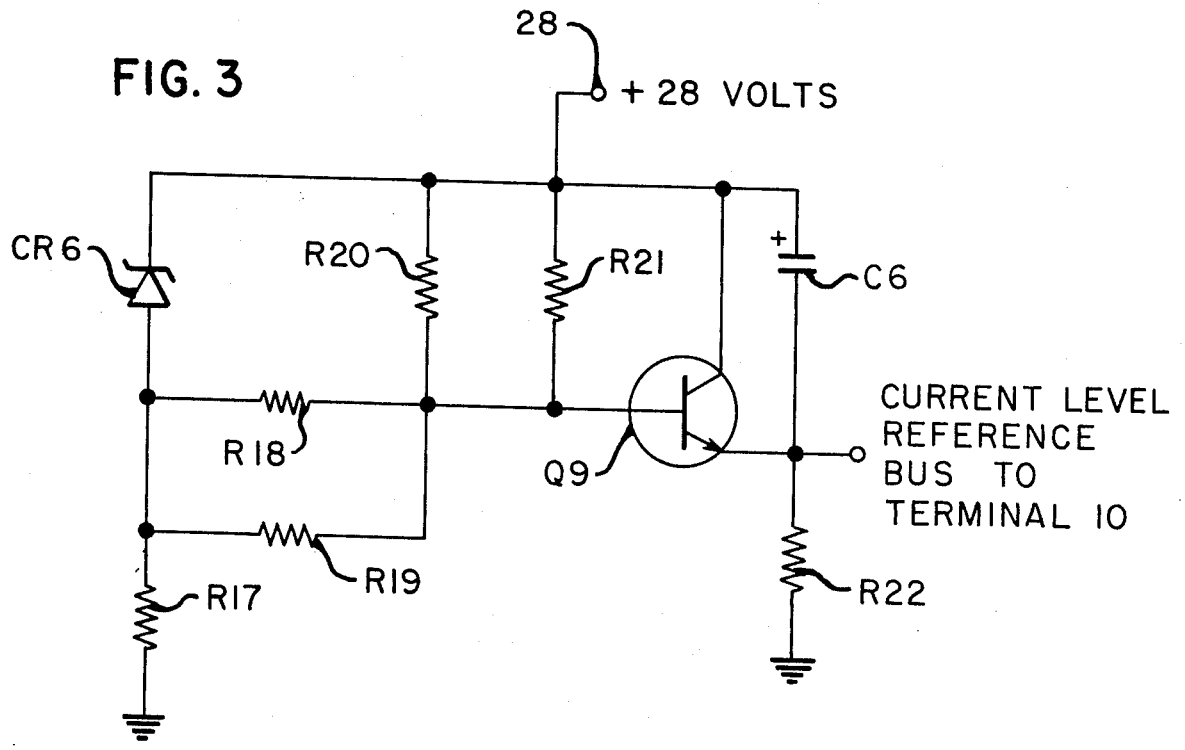
FIG. 3 is a schematic diagram of a current level reference circuit which may be used with the current driver circuit of FIG. 1.

Referring now to FIG. 3, a current level reference circuit which may be used in conjunction with the solenoid driver circuit of FIG. 1 is shown. Terminal 28 is connected to a positive 28 volt potential source and to the base of transistor Q9 by means of resistor R21. The collector of transistor Q9 is also connected to terminal 28. The emitter of transistor Q9 is connected to ground by resistor R22 and to its collector by means of an electrolytic capacitor C6. The output signal of the current level reference circuit labeled "CURRENT LEVEL REFERENCE BUS", is taken from the emitter of transistor Q9 and is applied to terminal 10 of the solenoid driver circuit shown in FIG. 1 A 5.6 volt zener diode CR6 is connected by means of resistor R17 to ground at the anode end and at the cathode end to terminal 28. Resistor R20 parallels resistor R21 and is used to achieve the accurate total resistance value needed to maintain the base biasing of transistor Q9 at a relatively constant level. The same is true for the parallel combination of resistors R18 and R19.

Referring to FIG. 4, the waveforms associated with a typical solenoid activation (print) cycle are shown. We can see that the PULSE WIDTH BUS signal shown in FIG. 4B at the initiation of a print cycle goes from 0 to +5 volts. The collector of transistor Q6 rises from a −28 volts to a positive 28 volts and current commences to flow in the solenoid 20 as shown in FIG. 4A. The collector of transistor Q7 moves from approximately −28 volts upwards towards the value of approximately −23 volts as shown in FIG. 4D. The base of transistor Q8 follows the waveform shown in FIG. 4E. FIG. 4F illustrates the waveform present at the collector of transistor Q8. The waveform at the emitter of transistor Q6 is shown in FIG. 4G with the solenoid voltage being shown in FIG. 4H. The waveform shown in FIG. 4I depicts the timing signal that is present at the collector of Q5.

The following is a list of component parts utilized in the preferred embodiment of the invention.

| Resistors | | |
|---|---|---|
| R1 | 1000Ω | 5% ¼ watt carbon composition |
| R2 | 3600Ω | 2% ¼ watt metal film |
| R3 | 510Ω | 2% ¼ watt metal film |
| R4 | 680Ω | 2% ¼ watt metal film |
| R5 | 560Ω | 5% ¼ watt carbon composition |
| R6, 7 | 5600Ω | 5% ¼ watt carbon composition |
| R8 | 47Ω | 5% ¼ watt carbon composition |
| R9 | 1600Ω | 2% ¼ watt metal film |
| R10 | 620Ω | 5% ¼ watt carbon composition |
| R11 | 1Ω | 2% 3 watt wirewound |
| R12 | 30KΩ | 5% ¼ watt carbon composition |
| R13, 19 | 11KΩ | 5% ¼ watt carbon composition |
| R14, 17 | 2400Ω | 2% ¼ watt metal film |
| R15 | 300Ω | 5% ¼ watt carbon composition |
| R16 | 330Ω | 2% ¼ watt metal film |
| R18 | 1200Ω | 2% ¼ watt metal film |
| R20 | 620Ω | 2% ¼ watt metal film |
| R21 | 6200Ω | 5% ¼ watt carbon composition |
| R22 | 8200Ω | 5% ¼ watt carbon composition |
| Transistors | | |
| Q1, 3, 4, 9 | | 2N3904 |
| Q2 | | 2N3906 |
| Q5 | | 2N5400 |
| Q6 | | 2N6041 |
| Q7 | | MPSA-13 |
| Q8 | | 2N6044 |
| Diodes | | |
| CR1, 2, 3 | | IN914 |
| CR4 | | IN4934 |
| CR5 | | IN4002 |
| CR6 | | IN7524 |
| Capacitors | | |
| C1 | .01uf | mylar | 100V |
| C2, 3 | 470pf | ceramic | 1000V |
| C4, 5 | 220pf | ceramic | 1000V |
| C6 | 12uf | tantalum | 6V |

While there has been shown what is considered to be the preferred embodiment of the invention, it will be manifest that many changes and modifications may be made therein, without departing from the essential spirit of the invention. It is intended, therefore, in the annexed claims, to cover all such changes and modifications as may fall within the true scope of the invention.

What is claimed is:

1. A solenoid actuating circuit comprising:
   a solenoid;
   means responsive to a control signal for applying a differential voltage to said solenoid until current in said solenoid reaches a predetermined level and for effectively disconnecting the differential voltage for fixed periods to allow the current in said solenoid to fall below the predetermined level; and
   means for generating said control signal periods of time corresponding at least to the desired activation of said solenoid.

2. An excitation control circuit for an actuating solenoid member comprising:
   an actuating solenoid;
   a first and a second terminal for receiving a differential voltage;
   switch means having a closed and an open state for connecting and disconnecting said first and said second terminal in circuit with said actuating solenoid in response to the commands of a control signal;
   means for providing a sensing signal indicative of the current level in said actuating solenoid; and
   means responsive to said sensing signal for providing said control signal for closing said switch means in response to a solenoid activation signal and for cyclically opening said switch means in response to the level of said sensed signal for fixed periods in order to maintain the level of current through said actuating solenoid below a pre-selected level during solenoid activation.

3. The circuit according to claim 2 wherein said means for providing a sensing signal is comprised of:
   a resistance, of a low value, connected in series with said actuating solenoid; and
   an amplifier means for amplifying the voltage developed across said resistance.

4. The circuit according to claim 2 and further comprising:
   means operatively connected to said actuating solenoid for absorbing the inductive kick of said actuating solenoid so as to enable rapid transition to a deenergized condition after the removal of said solenoid activation signal.

5. The circuit according to claim 2 wherein said first and said second terminals are operatively connected to a positive and a negative voltage respectively, and wherein said switch means is comprised of a first switch for connecting the said first terminal to one end of said actuating solenoid, and a second switch for connecting said second terminal to the other end of said actuating solenoid, said first and said second switches being responsive to the commands of said control signal.

6. The circuit according to claim 5 and further comprising:
   a first diode connecting said second terminal to said one end of said actuating solenoid; and
   a second diode connecting said first terminal to the other end of said solenoid, said diodes operative to absorb the inductive kick of said actuating solenoid.

7. An excitation control circuit for an actuating solenoid member comprising:

an actuating solenoid;

a first and a second terminal for receiving a differential voltage;

switch means for cyclically connecting and disconnecting said actuating solenoid between said first and said second terminal in response to a solenoid actuating signal;

sensing means for sensing the current through said solenoid for causing said switch means to disconnect said solenoid from between said first and said second terminal when the current level sensed in said solenoid reaches a predetermined level; and timing means responsive to the disconnecting of said solenoid for maintaining the disconnect for fixed periods of time.

8. The circuit according to claim 7 wherein said sensing means is comprised of:

a resistance, of a low value, connected in series with said actuating solenoid; and an amplifier means for amplifying the voltage developed across said resistance into a switch control signal for cyclically controlling said switch means.

9. The circuit according to claim 7 and further comprising:

means operatively connected to said actuating solenoid for absorbing the inductive kick of said actuating solenoid so as to enable rapid transition to a deenergized condition after the removal of said solenoid activation signal.

10. The circuit according to claim 7 and further comprising:

a first diode connecting said second terminal to said one end of said actuating solenoid; and a second diode connecting said second terminal to the other end of said solenoid, said diodes operative to absorb the inductive kick of said actuating solenoid.

* * * * *

UNITED STATES PATENT OFFICE
CERTIFICATE OF CORRECTION

Patent No. 4,041,546   Dated August 9, 1977

Inventor(s) John W. Stewart

It is certified that error appears in the above-identified patent and that said Letters Patent are hereby corrected as shown below:

Column 6, line 14, after "signal" should be --for--.

Signed and Sealed this

Fourth Day of July 1978

[SEAL]

Attest:

RUTH C. MASON
Attesting Officer

DONALD W. BANNER
Commissioner of Patents and Trademarks